(12) United States Patent
Hauser (10) Patent No.: US 10,458,359 B2
(45) Date of Patent: Oct. 29, 2019

(54) DETECTING A PREDETERMINED OPENING STATE OF A FUEL INJECTOR HAVING A SOLENOID DRIVE

(71) Applicant: CONTINENTAL AUTOMOTIVE GMBH, Hannover (DE)

(72) Inventor: Christian Hauser, Lappersdorf (DE)

(73) Assignee: CPT Group GmbH, Hannover (DE)

(*) Notice: Subject to any disclaimer, the term of this patent is extended or adjusted under 35 U.S.C. 154(b) by 0 days.

(21) Appl. No.: 15/950,647

(22) Filed: Apr. 11, 2018

(65) Prior Publication Data

US 2018/0230932 A1 Aug. 16, 2018

Related U.S. Application Data

(63) Continuation of application No. PCT/EP2016/072290, filed on Sep. 20, 2016.

(30) Foreign Application Priority Data

Oct. 20, 2015 (DE) ..................... 10 2015 219 673

(51) Int. Cl.
*F02D 41/40* (2006.01)
*F02D 41/20* (2006.01)
(Continued)

(52) U.S. Cl.
CPC ............ *F02D 41/40* (2013.01); *F02D 41/20* (2013.01); *F02D 41/2467* (2013.01);
(Continued)

(58) Field of Classification Search
CPC ...... F02D 41/40; F02D 41/20; F02D 41/2467; F02D 2041/2044; F02D 2041/2051;
(Continued)

(56) References Cited

U.S. PATENT DOCUMENTS 8,280,613 B2* 10/2012 Toyohara ............... F02D 41/20
701/105
2018/0156153 A1* 6/2018 Denk ..................... F02D 41/20

FOREIGN PATENT DOCUMENTS

DE 4322199 A1 1/1995
DE 19544207 A1 6/1997
(Continued)

OTHER PUBLICATIONS

International Search Report and Written Opinion dated Jan. 24, 2017 from corresponding International Patent Application No. PCT/EP2016/072290.
(Continued)

*Primary Examiner* — Hieu T Vo (57) ABSTRACT

A method for determining a time at which a fuel injector, for an internal combustion engine of a motor vehicle, is in a predetermined opening state comprises applying a predetermined electrical voltage profile to the solenoid drive, detecting the temporal profile of the current strength of a current flowing through the coil of the solenoid drive, detecting the temporal profile of the voltage across the coil, determining a function based on the temporal profile of the current strength and the temporal profile of the voltage, wherein the function represents the interlinked magnetic flux or a temporal derivative of the interlinked magnetic flux in the solenoid drive, and determining the time as the time at which the function has a characteristic feature.

20 Claims, 5 Drawing Sheets

(51) Int. Cl.
    *F02D 41/24*    (2006.01)
    *F02M 51/06*    (2006.01)
(52) U.S. Cl.
    CPC ... *F02M 51/061* (2013.01); *F02D 2041/2044* (2013.01); *F02D 2041/2051* (2013.01); *F02D 2041/2055* (2013.01); *F02D 2041/2058* (2013.01); *Y02T 10/44* (2013.01)
(58) Field of Classification Search
    CPC .... F02D 2041/2055; F02D 2041/2058; F02M 51/061; Y02T 10/44
    See application file for complete search history.

(56)    References Cited

FOREIGN PATENT DOCUMENTS

| | | |
|---|---|---|
| DE | 10150199 A1 | 4/2003 |
| DE | 102009027311 A1 | 1/2011 |
| DE | 102010063009 A1 | 6/2012 |
| DE | 102011075935 A1 | 11/2012 |
| DE | 102011076363 A1 | 11/2012 |
| DE | 102011087418 A1 | 6/2013 |
| DE | 102012216611 A1 | 4/2014 |
| DE | 102013203130 A1 | 8/2014 |

OTHER PUBLICATIONS

German Office Action dated Apr. 29, 2016 for corresponding German Patent Application No. 10 2015 219 673.9.

\* cited by examiner

DETECTING A PREDETERMINED OPENING STATE OF A FUEL INJECTOR HAVING A SOLENOID DRIVE

CROSS REFERENCE TO RELATED APPLICATIONS

This U.S. patent application claims the benefit of PCT patent application No. PCT/EP2016/072290, filed Sep. 20, 2016, which claims the benefit of German patent application No. 10 2015 219 673.9, filed Oct. 12, 2015, both of which are hereby incorporated by reference.

TECHNICAL FIELD

The present invention relates to the actuation of fuel injectors. In particular, a method for determining a time at which a fuel injector for an internal combustion engine of a motor vehicle is in a predetermined state.

BACKGROUND

To inject fuel into a combustion chamber, such as a cylinder, a fuel injector may be used, such as for example a solenoid valve or a solenoid injector. Such a solenoid injector (also called a coil injector) has a coil which generates a magnetic field when current flows through the coil, whereby a magnetic force is exerted on an armature so that the armature moves in order to cause an opening or closing of a nozzle needle or a closing element, for opening or closing the solenoid valve. If the solenoid valve or injector has a so-called idle stroke between the armature and the nozzle needle, or between the armature and the closing element, a movement of the armature does not lead to a movement of the closing element or nozzle needle immediately, but only after the armature has completed its movement through the idle stroke.

When a voltage is applied to the coil of the solenoid valve, electromagnetic forces move the armature in the direction of a pole piece or pole shoe. After overcoming the idle stroke, a mechanical coupling (e.g. a mechanical contact) also causes the movement of the nozzle needle or closing element and, for a corresponding shift, opens injection holes for the supply of fuel into the combustion chamber. If further current flows through the coil, the armature and nozzle needle or closing element move further until the armature reaches or stops on the pole piece. The distance between the stop of the armature on a carrier of the closing element or nozzle needle, and the stop of the armature on the pole piece, is also called the needle stroke or working stroke. In order to close the fuel injector, the exciter voltage applied to the coil is switched off and the coil is closed briefly so that the magnetic force discharges. The coil short-circuit causes a reversal of polarity of the voltage because of the discharge of the magnetic field stored in the coil. The level of the voltage is limited by a diode. The nozzle needle or closing element, including armature, is moved to the closing position because of a return force provided for example by a spring. The idle stroke and the needle stroke are run in reverse order. For short injection times, the closing process begins even before the armature has stopped on the pole piece, so the needle movement thus describes a ballistic trajectory.

The time of starting the needle movement on opening of the fuel injector (also known as OPP1) corresponds to the start of the injection, and the time of ending the needle movement on closing of the fuel injector (also known as OPP4) corresponds to the end of the injection. These two times therefore determine the hydraulic duration of the injection. Consequently, for identical electrical actuation, injector-specific temporal variations for the start of the needle movement (opening) and the end of the needle movement (closing) can lead to different injection quantities.

Accordingly, the above-mentioned times (and further relevant times) which correspond to specific opening states can be determined in various ways. These times are normally determined based on the coupling, caused by eddy current, between the mechanical elements (armature and injector needle) and the magnetic circuit (coil), which generates a feedback signal based on the movement of the mechanical elements. A speed-dependent eddy current is induced in the armature because of the movement of the nozzle needle and armature, which also causes a feedback on the electromagnetic circuit. Depending on the movement speed, a voltage is induced in the solenoid which is superposed on the actuation signal. Utilisation of this effect means that the superposition of the electrical base parameters of voltage or current with the signal change from the needle movement can suitably be separated and then processed further. The characteristic signal form in the voltage or current signal is evaluated relative to the time of occurrence. The signals for needle opening are then detected in the current profile, and those for needle closing in the voltage profile. This is illustrated as an example for OPP1. The armature meets the needle and carries this with it. The change in armature speed induces an eddy current which can be detected in the current profile as the OPP1 signal.

Thus for example, the time OPP1 at which the armature meets the needle and carries this along, whereby the change in armature speed induces an eddy current and the needle movement begins, can be determined by determining a local maximum in the second temporal derivative of the coil current. However, there is the occurrence of several maxima, so an additional plausibility check process is necessary in order to determine the correct maximum.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to a first aspect, a method is described for determining a time at which a fuel injector having a solenoid drive, for an internal combustion engine of a motor vehicle, is in a predetermined opening state. The method comprises: (a) applying a predetermined electrical voltage profile to the solenoid drive, (b) detecting the temporal profile of the current strength of a current flowing through the coil of the solenoid drive, (c) detecting the temporal profile of the voltage across the coil, (d) determining a function based on the temporal profile of the current strength and the temporal profile of the voltage, wherein the function represents the interlinked magnetic flux or a temporal derivative of the interlinked magnetic flux in the solenoid drive, and (e) determining the time as the time at which the function has a characteristic feature.

The method described utilizes movement changes in the mechanical system (for example the armature and needle) of a fuel injector lead to corresponding changes in the profile of the interlinked magnetic flux in the magnetic circuit. By detecting the respective temporal profile of the current strength and voltage while the fuel injector is actuated by application of a predetermined electrical voltage profile to the solenoid drive, and determining a function which represents the interlinked magnetic flux or a temporal derivative (first derivative, second derivative, third derivative etc.) of the interlinked magnetic flux in the solenoid drive, the time at which the fuel injector is in a predetermined opening state can be determined, namely as the time at which the function has a characteristic feature.

In this document, the term "opening state" may designate a state which occurs during an injection process, i.e. during the opening, injection or closing phase of the fuel injector. Examples are (i) start of electrical actuation or start of armature movement (also called OPP0), (ii) occurrence of the mechanical coupling between the armature and nozzle needle, or start of needle movement on opening (also called OPP1), (iii) stoppage of the needle on the pole piece, or end of the opening process (also called OPP2), (iv) initiation of the closing process or start of the needle movement on closing (also called OPP3), (v) end of the mechanical coupling between the needle and armature, or end of the needle movement on closing (also called OPP4), and (vi) end of the armature movement on closing (also called OPP5).

In this document, the term "predetermined voltage profile" may mean a voltage which varies temporally in portions and is used to actuate the fuel injector. The predetermined voltage profile may for example have a boost phase, a holding phase and a closing phase.

In this document, the term "function" may mean a mathematical function with which a value corresponding to a predefined time can be calculated. The function may be stored as a table in the memory (for example of an engine control unit), wherein values which do not arise directly from the table can be calculated by interpolation.

In this document, the term "characteristic feature" may mean a property of a function which can be detected by mathematical analysis of the corresponding curve profile, for example by numerical methods.

According to one exemplary embodiment, the characteristic feature is a (local or global) maximum, a (local or global) minimum, a threshold value or an inflection point.

According to a further exemplary, the determination of the function comprises a calculation of f(t)=u(t)−R*i(t), wherein u(t) is the temporal profile of the voltage across the coil, R the electrical resistance of the coil, and i(t) the temporal profile of the current strength of the current flowing through the coil.

This function f(t) corresponds to the temporal derivative of the interlinked magnetic flux Ψ (Psi), i.e.

$$f(t) = \frac{d\Psi}{dt}.$$

According to a further exemplary embodiment, the function is equal to f(t). In this exemplary embodiment, the extreme may be in other words determined directly in the temporal derivative of the interlinked magnetic flux.

According to a further exemplary embodiment, the determination of the function comprises calculation of the interlinked magnetic flux by integration of f(t) and calculation of the temporal derivative of the interlinked magnetic flux. This exemplary embodiment may be relevant if the interlinked magnetic flux is also used for further purposes or analyses (for example, in the engine control unit).

According to a further exemplary embodiment, the function and/or time may be determined using numerical methods.

For example, a modern engine controller may be configured or programmed relatively easily so that calculations can be performed for determining the function and extreme from the detected voltage and current strength.

According to a further exemplary embodiment, the extreme is a maximum, for example a local or global maximum.

According to a further exemplary embodiment, the predetermined opening state of the fuel injector may be the start of an opening phase, the end of the opening phase, the start of a closing phase or the end of the closing phase.

In other words, using the method, the times corresponding to the opening states OPP1, OPP2, OPP3 and OPP4 may be determined easily and precisely.

According to a second aspect, a method is described for actuating a fuel injector having a solenoid drive. The method described comprises the following: (a) performance of a method for determining a time at which the fuel injector is in a predetermined opening state, according to the first aspect or any of the above-mentioned exemplary embodiments, and (b) actuation of the fuel injector based on the determined time, wherein For example a duration between the application of a boost voltage for opening the fuel injector and the application of a voltage for closing the fuel injector is reduced or increased, if it is determined that the time occurs later or earlier than a reference time.

With this, by using the method according to the first aspect, accurate control of the precise injection quantity may be achieved in a simple and reliable fashion. For example, the actual start (or actual end) of the hydraulic duration of the injection can be determined and corrected by adapting the actuation of the fuel injector so that the desired injection quantity is achieved.

According to a third aspect, an engine controller for a vehicle is described, for using a method according to the first/second aspect and/or any of the above-mentioned exemplary embodiments.

This engine controller may allow, by use of the method according to the first aspect, accurate control of the precise injection quantities of the individual fuel injectors in a simple and reliable fashion.

According to a fourth aspect, a computer program is described which, when executed by a processor, is configured to perform the method according to the first/second aspect and/or any of the above-mentioned exemplary embodiments.

In the sense of this document, the term "computer program" may be equivalent to the concept of a program element, a computer program product and/or a computer-legible medium containing instructions for controlling a computer system, in order to coordinate the working method of a system or process in a suitable fashion, so as to achieve the various methods described herein.

The computer program may be implemented as a computer-legible instruction code in any suitable programming language, such as for example JAVA, C++ etc. The computer program may be stored on any computer-legible storage medium (CD-Rom, DVD, Blu-ray disk, removable drive, volatile or non-volatile memory, integral memory/processor etc.). The instruction code may program a computer or other programmable device, such as for example a control unit for an engine of a motor vehicle, such that the desired functions are executed. Furthermore, the computer program may be provided in a network such as for example the Internet, from which a user can download it as required.

The invention may also be implemented by a computer program, i.e. software, and also by one or more specific electrical circuits, i.e. as hardware or in any desired hybrid form, i.e. by software components and hardware components.

It should be noted that, the embodiments have been described with reference to different implementations of the features. For example, some embodiments of the invention are described by way of method and other embodiments are described by way of apparatus implementations. However, it should be clear to a person skilled in the art upon, that unless explicitly stated otherwise, in addition to a combination of features which are associated with one type of subject matter, any combination of features which are associated with different types of implementations is also possible.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Further advantages and features of the present disclosure can be found in the exemplary description of a preferred embodiment which follows.

DETAILED DESCRIPTION

It should be noted that the embodiments described below are merely a limited selection of possible variant embodiments of the invention.

Figure 1:
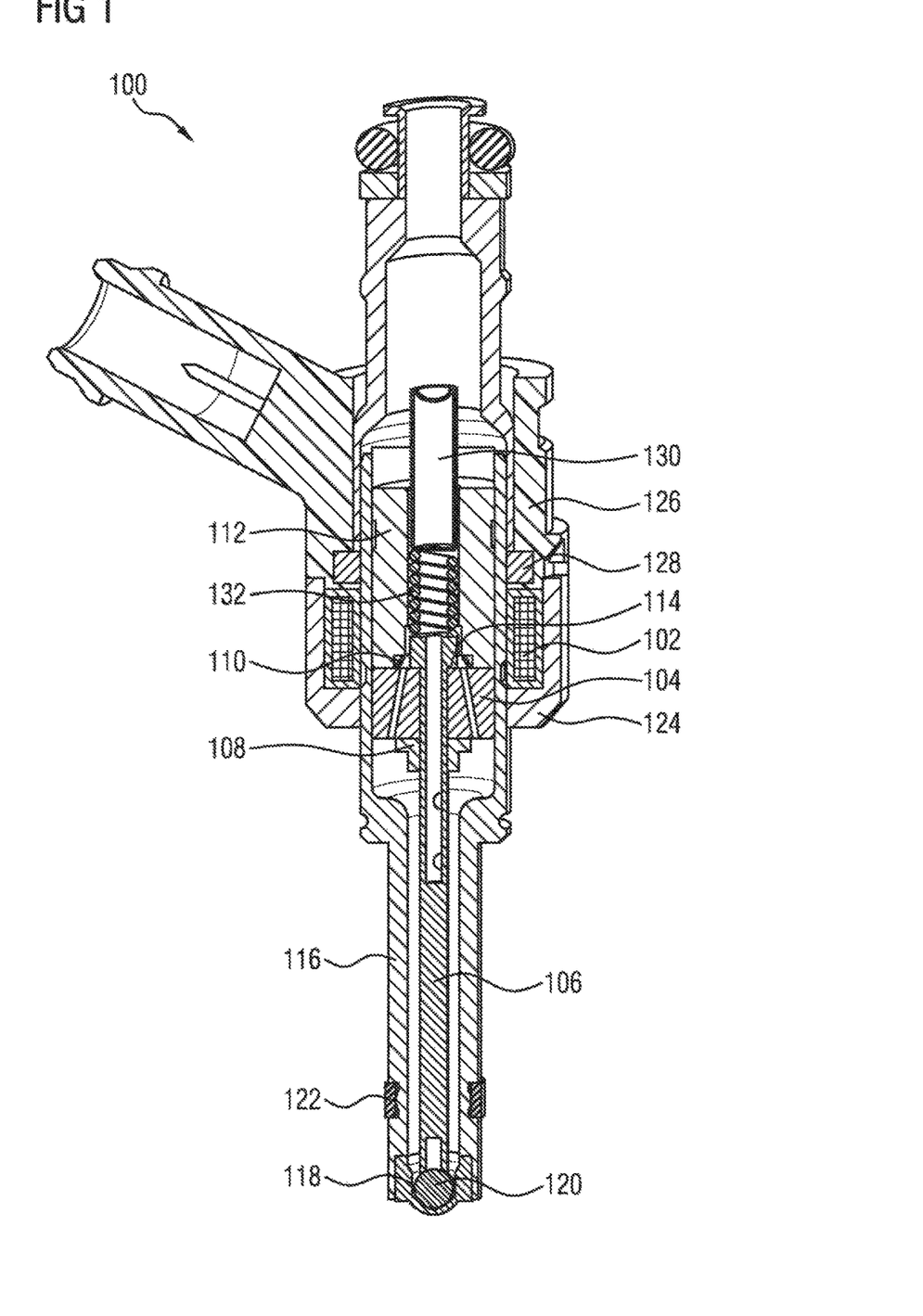
FIG. 1 shows a fuel injector with solenoid drive.

FIG. 1 shows a sectional view of a fuel injector 100 with solenoid drive (solenoid injector). The injector 100 comprises a solenoid drive with coil 102 and armature 104. When a voltage pulse is applied to the coil 102, the magnetic armature 104 moves in the direction of the wide part of the nozzle needle 106 and then, after overcoming the idle stroke 114 (against the force of the spring 110), presses this upward against the spring forces exerted by the springs 110 and 132 until the armature 104 stops on the pole shoe 112. When the voltage pulse is ended, the armature 104 and the nozzle needle 106 move back down again to the starting position on the hydro-disc 108.

The solenoid injector 100 shown in FIG. 1 has a valve body 116, integrated seat guide 118, ball 120, seal 122, housing 124, plastic 126, disk 128, metal filter 130 and calibration spring 132. One skilled in the art would be able to determine the arrangement, combinations, features and various methods of operation of these components separately and with one another for the solenoid injector 100.

Figure 2:
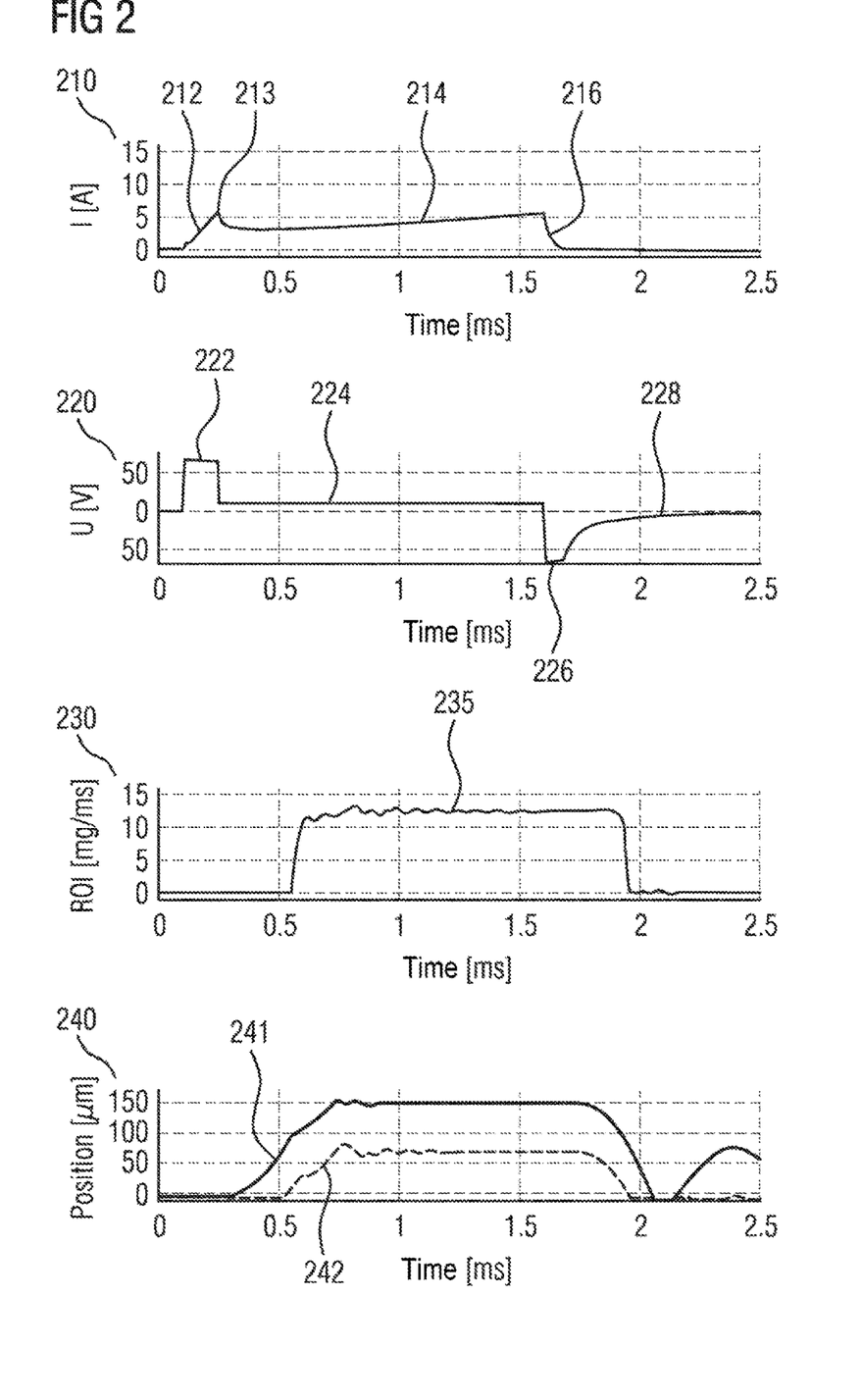
FIG. 2 shows diagrams of current strength, voltage, injection rate, armature and needle position, as functions of time on actuation of the fuel injector.

FIG. 2 shows diagrams of current strength 210, voltage 220, injection rate 230, and armature and needle position 240, as functions of the time of actuation of the fuel injector, such as for example the fuel injector 100 described above. For example, diagram 220 shows a (predetermined) voltage profile with a boost phase 222 (in which an increased voltage of around 65 V is used), a holding phase 224 (in which a voltage of around 12 V is used), and a closing phase 226, 228 (in which firstly the polarity of the voltage is reversed, and then the voltage rises in the direction towards 0 V). Diagram 210 shows the corresponding profile of the current strength, wherein the current strength during the boost phase 212 rises to a peak value (peak current) 213, remains relatively constant in the holding phase 214, and then falls rapidly in the closing phase 216. Diagram 230 shows the corresponding profile of the injection rate which is greater than zero from the start ($t \approx 0.55$ ms) to the end ($t \approx 1.95$ ms) of the injection phase 235. Finally, diagram 240 shows the corresponding profiles of the armature position or stroke 241, and the needle position or stroke 242. Diagram 240 shows that the movement of the needle begins at $t \approx 0.55$ ms (OPP1) and ends at $t \approx 1.95$ ms (OPP4).

Figure 3:
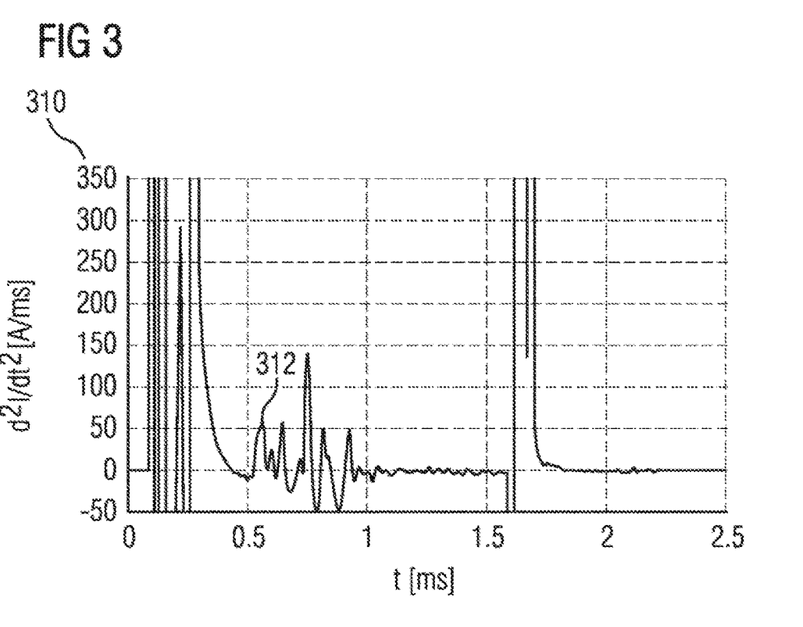
FIG. 3 shows a diagram of the second temporal derivative of the current strength shown in FIG. 1.

FIG. 3 shows a diagram of the second temporal derivative 310 of the current strength shown in FIG. 1. As described in the introduction, the time of the opening state OPP1 ($t \approx 0.55$ ms) can be detected as the local maximum 312. However, as can also be seen, the curve profile has many extremes, which makes determination difficult and may require a plausibility check process associated with further expense.

Figure 4:
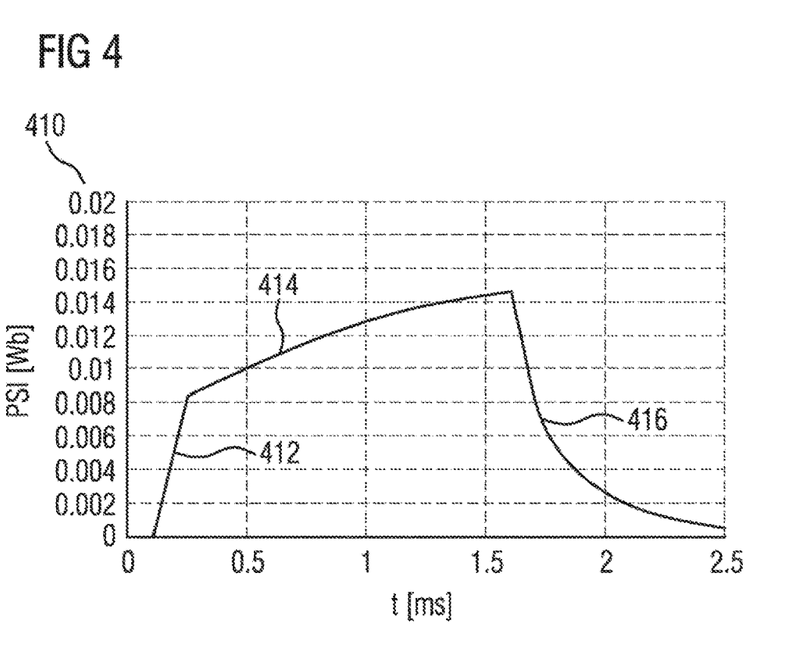
FIG. 4 shows a diagram of the interlinked magnetic flux as a function of time on actuation of the fuel injector.

FIG. 4 shows a diagram of the interlinked magnetic flux 410 as a function of time on actuation of the fuel injector 100 shown in FIG. 2. The profile 410 falls into three main portions: a first portion 412 (boost phase) in which the flux rises steeply, a second portion 414 (injection phase) in which the flux rises less steeply, and a third portion 416 (closing phase) in which the flux falls again.

Figure 5:
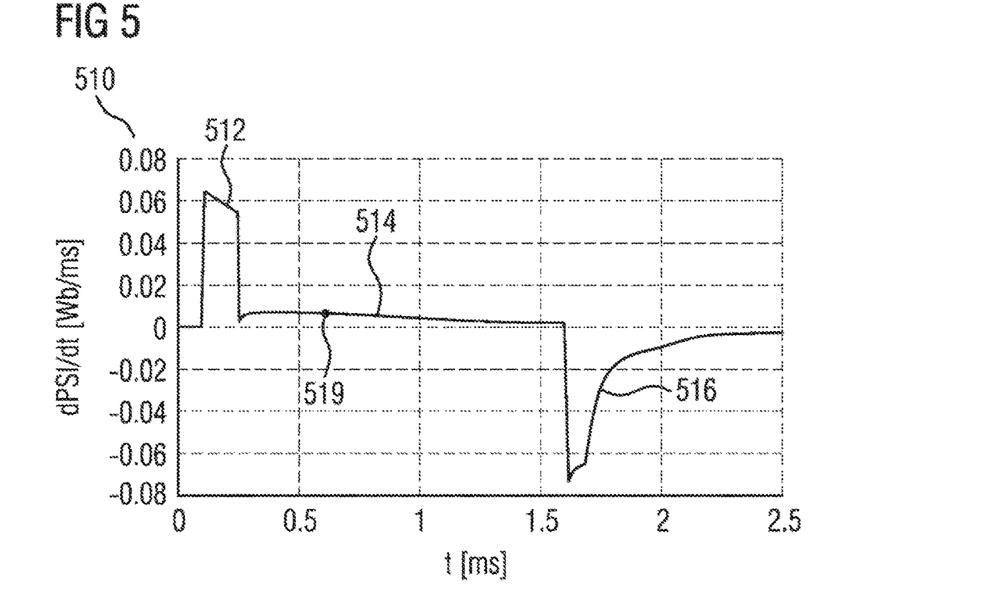
FIG. 5 shows a diagram of the temporal derivative of the interlinked magnetic flux shown in FIG. 4 as a function of time.

FIG. 5 shows a diagram of the temporal derivative 510 of the interlinked magnetic flux 410 shown in FIG. 4 as a function of time. The curve portions 512, 514 and 516 corresponds to the curve portions 412, 414 and 416 in FIG. 4. Furthermore, point 519 (at $t \approx 0.55$ ms) corresponding to the opening state OPP1 is marked in the curve 510.

Figure 6:
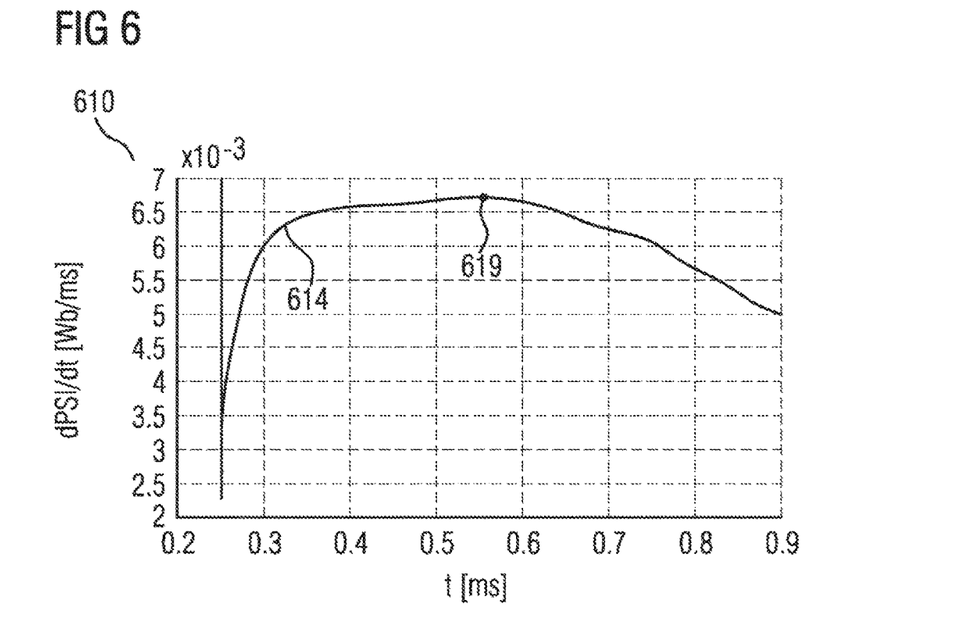
FIG. 6 shows an enlarged extract of the diagram shown in FIG. 5.

FIG. 6 shows an enlarged extract 610 of the diagram 510 shown in FIG. 5. In the extract 610, point 619 (at $t \approx 0.55$ ms) corresponding to the opening state OPP1 is again marked, and it can be seen that the temporal derivative 614 of the interlinked magnetic flux here has a local maximum which is not surrounded by many other local maxima and consequently is relatively easy to determine.

Figure 7:
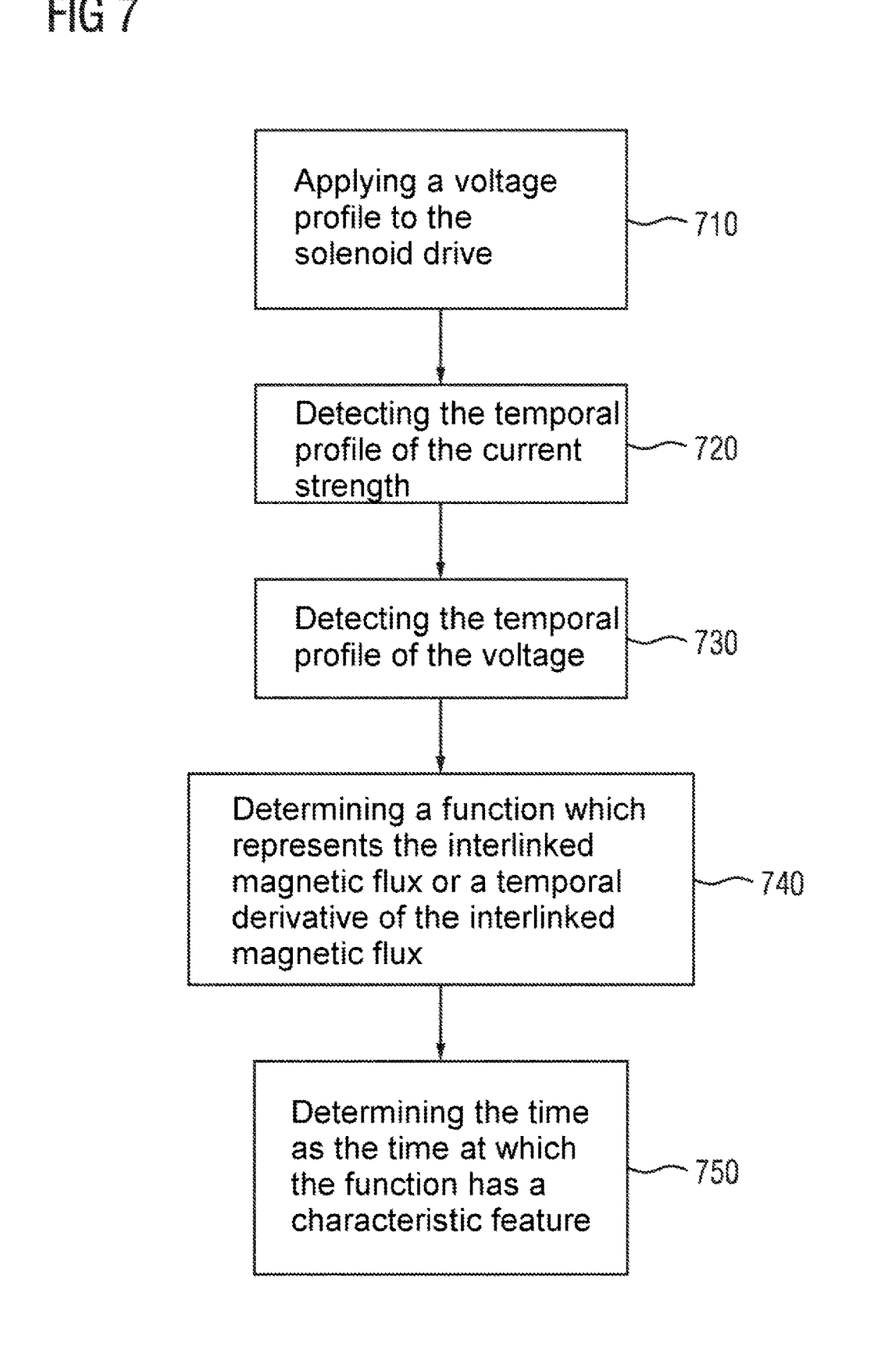
FIG. 7 shows a flow diagram of a method according to the invention.

FIG. 7 shows a flow diagram of a method according to the invention for determining a time at which a fuel injector having a solenoid drive is in a predetermined opening state. The first predetermined state may for example be OPP1.

In step 710, a predetermined electrical voltage profile is applied to the solenoid drive of the fuel injector 100. The predetermined voltage profile corresponds to a normal actuation of the fuel injector 100 and comprises for example a boost phase, a holding phase and a closing phase. For short injections, for example in conjunction with multiple injections, in which the nozzle needle describes a ballistic trajectory, the predetermined voltage profile may comprise only a boost phase and a closing phase (i.e. no holding phase).

In step 720, the temporal profile of the current strength of a current flowing through the coil of the solenoid drive is detected. For example, values of the current strength are measured or sampled at short temporal intervals, and stored as digital values in the memory, for example in the engine control unit.

Similarly, in step 730, the temporal profile of the voltage across the coil is detected. For example, values of the voltage are measured or sampled with short temporal intervals, and stored as digital values in the memory, for example in the engine control unit.

In step 740, a function based on the temporal profile of the current strength and the temporal profile of the voltage is determined, wherein the function represents the interlinked magnetic flux or a temporal derivative of the interlinked magnetic flux in the solenoid drive.

Here, a function which represents the temporal derivative of the interlinked magnetic flux may be used. If the engine control unit detects the interlinked magnetic flux for other purposes, the function can then be determined as a derivative of this. Alternatively, the function can be determined as $f(t)=u(t)-R*i(t)$, wherein $u(t)$ is the temporal profile of the voltage across the coil, R the electrical resistance of the coil, and $i(t)$ the temporal profile of the current strength of the current flowing through the coil.

The function f(t) shown above—apart from an integration constant which is irrelevant for the occurrence of a characteristic feature, for example an extreme—is equal to the temporal derivative of the interlinked magnetic flux. Here, the measured voltage $u(t)$ consists of an ohmic part ($R*i(t)$) and an inductive part ($u_{ind}(t)$). The inductive voltage is calculated from the temporal derivative of the interlinked magnetic flux $d\Psi/dt$, wherein $\Psi$ depends on the current change $i(t)$ and the air gap $x(t)$.

$$u(t) = i(t)R + u_{ind}(t) = i(t)R + \frac{d\Psi(i,x)}{dt} = i(t)R + \left(\frac{d\Psi(i,x)}{di}\frac{di}{dt} + \frac{d\Psi(i,x)}{dx}\frac{dx}{dt}\right)$$

On slow actuation, the "magnetic" part of the induction from current change is small.

$$u_{ind1} = \frac{d\Psi(i,x)}{di}\frac{di}{dt}$$

The "mechanical" part of the induction from the armature movement then describes the strokes (idle stroke and/or working stroke) of the fuel injector.

$$u_{ind2} = \frac{d\Psi(i,x)}{dx}\frac{dx}{dt}$$

By transposition and integration, the interlinked magnetic flux can be calculated as follows:

$$\Psi = \int (u(t)-i(t)R)dt$$

It is clear from this that $f(t) \approx d\Psi/dt$.

Finally, in step 750, the time corresponding to the predetermined opening state (for example OPP1) is determined as the time at which the function has a characteristic feature, for example, an extreme. This feature may be determined for example using numerical methods known in themselves.

With one embodiment of the method, the time at which a fuel injector is in a predetermined opening state (for example OPP1) can be determined easily and precisely (based on measurements of current strength and voltage). The determined time may be used, for example by the engine control unit to adapt the voltage profile used on actuation of the fuel injector in order to achieve or come closer to a predetermined injection quantity.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. An engine controller for a vehicle, which engine controller is configured to perform instructions for:
    applying a predetermined electrical voltage profile to a solenoid drive of the fuel injector;
    detecting the temporal profile of the current strength of a current flowing through the coil of the solenoid drive;
    detecting the temporal profile of the voltage across the coil;
    determining a function based on the temporal profile of the current strength and the temporal profile of the voltage, wherein the function represents one of the interlinked magnetic flux and a temporal derivative of the interlinked magnetic flux in the solenoid drive; and
    determining the time as the time at which the function has a characteristic feature.

2. The engine controller of claim 1, wherein the characteristic feature is one of: a maximum, a minimum, a threshold value and an inflection point.

3. The engine controller of claim 1, wherein the function comprises a calculation of $f(t)=u(t)-R*i(t)$, wherein $u(t)$ is the temporal profile of the voltage across the coil, R the electrical resistance of the coil, and $i(t)$ the temporal profile of the current strength of the current flowing through the coil.

4. The engine controller of claim 3, wherein the function comprises calculation of the interlinked magnetic flux by integration of f(t) and calculation of the temporal derivative of the interlinked magnetic flux.

5. The engine controller of claim 1, wherein at least one of the function and time are determined using numerical methods.

6. The engine controller of claim 1, wherein the predetermined opening state of the fuel injector is one of: the start of an opening phase, the end of the opening phase, the start of a closing phase and the end of the closing phase.

7. A method for determining a time at which a fuel injector for an internal combustion engine of a motor vehicle is in a predetermined opening state comprising:
    applying a predetermined electrical voltage profile to a solenoid drive of the fuel injector;
    detecting the temporal profile of the current strength of a current flowing through the coil of the solenoid drive;
    detecting the temporal profile of the voltage across the coil;
    determining a function based on the temporal profile of the current strength and the temporal profile of the voltage, wherein the function represents one of the interlinked magnetic flux and a temporal derivative of the interlinked magnetic flux in the solenoid drive; and determining the time as the time at which the function has a characteristic feature.

8. The method of claim 1, wherein the characteristic feature is one of: a maximum, a minimum, a threshold value and an inflection point.

9. The method of claim 1, wherein the determination of the function comprises a calculation of $f(t)=u(t)-R*i(t)$, wherein $u(t)$ is the temporal profile of the voltage across the coil, R the electrical resistance of the coil, and $i(t)$ the temporal profile of the current strength of the current flowing through the coil.

10. The method of claim 9, wherein the function is equal to $f(t)$.

11. The method of claim 9, wherein the determination of the function comprises calculation of the interlinked magnetic flux by integration of $f(t)$ and calculation of the temporal derivative of the interlinked magnetic flux.

12. The method of claim 1, wherein at least one of the function and time are determined using numerical methods.

13. The method of claim 1, wherein the predetermined opening state of the fuel injector is one of: the start of an opening phase, the end of the opening phase, the start of a closing phase and the end of the closing phase.

14. A method for actuating a fuel injector having a solenoid drive comprising:
  applying a predetermined electrical voltage profile to a solenoid drive of the fuel injector;
  detecting the temporal profile of the current strength of a current flowing through the coil of the solenoid drive;
  detecting the temporal profile of the voltage across the coil;
  determining a function based on the temporal profile of the current strength and the temporal profile of the voltage, wherein the function represents one of the interlinked magnetic flux and a temporal derivative of the interlinked magnetic flux in the solenoid drive; and
  determining the time the fuel injector is in a predetermined open state as the time at which the function has a characteristic feature;
  actuating the fuel injector based on the determined time, wherein a duration between the application of a boost voltage for opening the fuel injector and the application of a voltage for closing the fuel injector is changed when it is determined that the time occurs one of later and earlier than a reference time.

15. The method of claim 14, wherein the characteristic feature is one of: a maximum, a minimum, a threshold value and an inflection point.

16. The method of claim 14, wherein the determination of the function comprises a calculation of $f(t)=u(t)-R*i(t)$, wherein $u(t)$ is the temporal profile of the voltage across the coil, R the electrical resistance of the coil, and $i(t)$ the temporal profile of the current strength of the current flowing through the coil.

17. The method of claim 16, wherein the function is equal to $f(t)$.

18. The method of claim 16, wherein the determination of the function comprises calculation of the interlinked magnetic flux by integration of $f(t)$ and calculation of the temporal derivative of the interlinked magnetic flux.

19. The method of claim 14, wherein at least one of the function and time are determined using numerical methods.

20. The method of claim 14, wherein the predetermined opening state of the fuel injector is one of: the start of an opening phase, the end of the opening phase, the start of a closing phase and the end of the closing phase.

* * * * *